(12) United States Patent
Takenaga

(10) Patent No.: US 6,782,267 B1
(45) Date of Patent: Aug. 24, 2004

(54) METHOD AND SYSTEM FOR PROVIDING REGIONAL INFORMATION

(75) Inventor: Takashi Takenaga, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 393 days.

(21) Appl. No.: 09/575,721

(22) Filed: Aug. 3, 2000

(30) Foreign Application Priority Data

Aug. 27, 1999 (JP) ......................................... P.11-240996

(51) Int. Cl.⁷ ............................................... H04Q 7/20
(52) U.S. Cl. .............................. 455/456.5; 455/456.1; 455/550.1; 455/552.1
(58) Field of Search ................................ 455/456, 550, 455/556, 557, 558, 466, 414, 412, 413, 425, 575, 186.1, 456.5, 557.7, 569.1, 404.2, 453, 456.1, 552.1

(56) References Cited

U.S. PATENT DOCUMENTS

| | | | | |
|---|---|---|---|---|
| 5,426,594 A | * | 6/1995 | Wright et al. ................ | 709/206 |
| 5,604,788 A | * | 2/1997 | Tett ............................. | 455/412 |
| 5,742,905 A | * | 4/1998 | Pepe et al. ................... | 455/461 |
| 5,774,803 A | * | 6/1998 | Kariya ........................ | 455/414.2 |
| 5,948,040 A | * | 9/1999 | DeLorme et al. ........... | 701/201 |
| 6,167,251 A | * | 12/2000 | Segal et al. .................. | 455/406 |
| 6,282,517 B1 | * | 8/2001 | Wolfe et al. ................. | 705/26 |
| 6,289,212 B1 | * | 9/2001 | Stein et al. .................. | 455/412 |
| 6,298,231 B1 | * | 10/2001 | Heinz .......................... | 455/413 |
| 6,411,685 B1 | * | 6/2002 | O'Neal ...................... | 379/88.14 |
| 6,434,405 B1 | * | 8/2002 | Sashihara .................... | 455/557 |
| 6,446,109 B2 | * | 9/2002 | Gupta ......................... | 709/203 |
| 6,463,134 B1 | * | 10/2002 | Okada et al. ............. | 379/93.24 |

FOREIGN PATENT DOCUMENTS

| | | |
|---|---|---|
| DE | 197 30 411 A1 | 1/1999 |
| JP | 10-185599 | 7/1998 |

* cited by examiner

*Primary Examiner*—Cong Van Tran
(74) *Attorney, Agent, or Firm*—Sughrue Mion, PLLC

(57) ABSTRACT

A regional information providing method comprises the steps of: retrieving and obtaining regional information on a desired area from a regional information database site S2 stored with the regional information via the Internet, using a terminal unit T; transmitting the regional information on the desired area thus obtained to an electronic mail site S3 together with the electronic mail address of a portable information terminal unit E to be carried into the area as well as preserving the regional information therein; and making the portable information terminal unit carried into the desired area receive the regional information preserved in the electronic mail site S3 and also display regional information images on the display unit of the portable information terminal unit E.

20 Claims, 2 Drawing Sheets

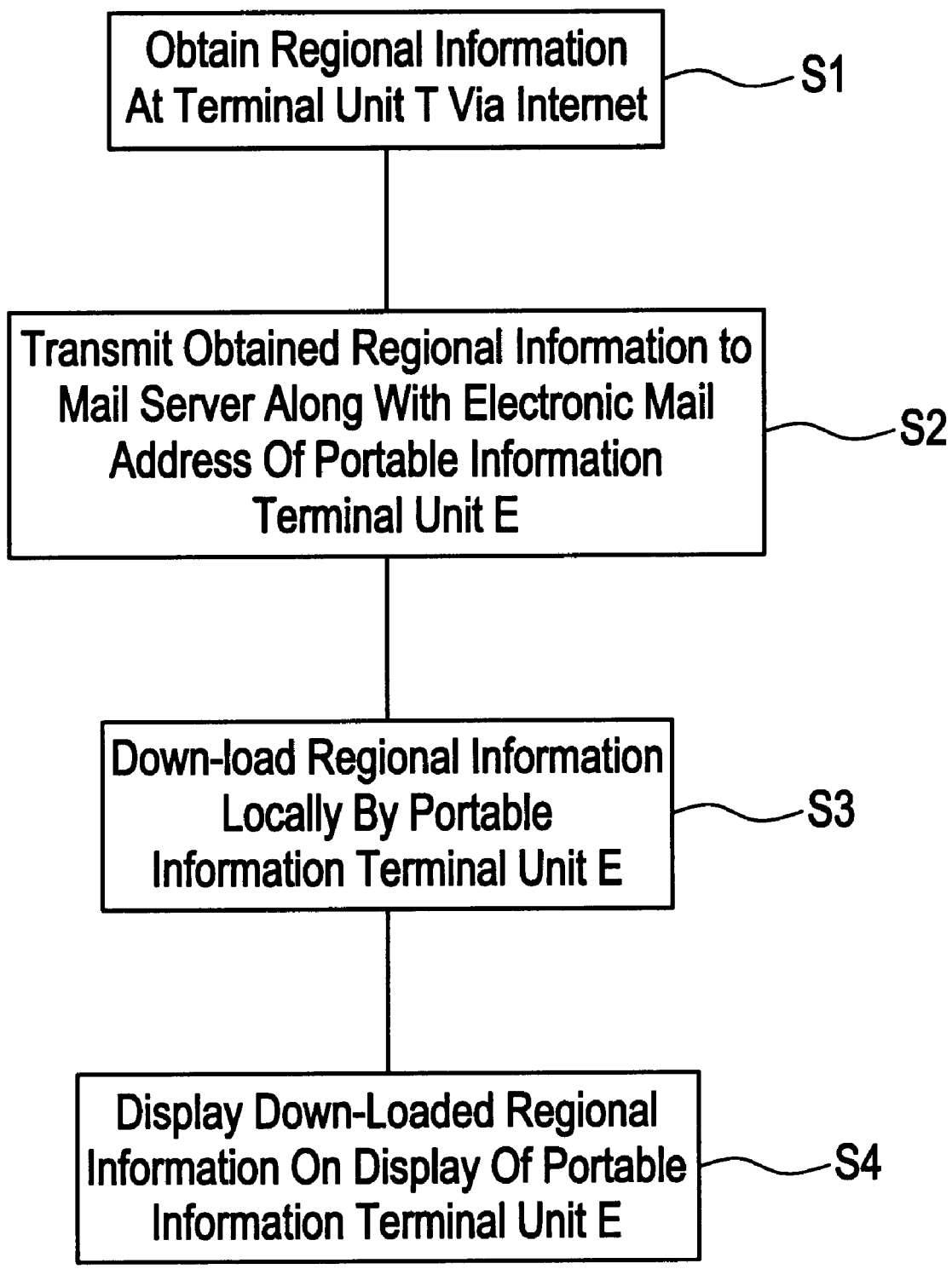

METHOD AND SYSTEM FOR PROVIDING REGIONAL INFORMATION

BACKGROUND OF THE INVENTION

This invention relates to a method for acquiring information about any given area while a person is traveling within the area and to a system for implementing the method.

With the diffusion of information retrieval equipment such as microcomputers and the rapid extension of services of providing information via the Internet, it has been attempted to improve map information retrieval display systems.

For example, electronic dictionaries of map information developed for use in information retrieval equipment, and servers connected to the Internet and used to provide map information have been made serviceable.

Such a map information retrieval display system is utilized in a way of retrieving map data on a desired area from a database by inputting land marks including an address and a facility name, and displaying the map data on a display unit or printing the data.

When a person visits a certain area for delivering goods or on business, for example, information on the area is utilized according to the method of retrieving the information from the database, displaying and printing the data for confirming purposes.

However, the current demand is for the map information retrieval display system to be utilized more effectively.

SUMMARY OF THE INVENTION

The present invention is intended to extensively utilize the map information retrieval display system above.

In other words, a first object of the invention is to provide a method of providing regional information on any given area that can simply be utilized by a person who is traveling within the area.

A second object of the invention is to provide a system for implementing the method of providing the regional information.

In order to accomplish the first object above, a regional information providing method according to a first invention comprises the steps of: retrieving and obtaining regional information on a desired area from a database stored with the regional information, using information retrieval equipment; transmitting the regional information on the desired area thus obtained to an electronic mail server together with the electronic mail address of a portable information terminal unit to be carried into the area as well as preserving the regional information therein; and making the portable information terminal unit carried into the desired area receive the regional information preserved in the electronic mail server and also display regional information images on the display unit of the portable information terminal unit.

The regional information providing method according to the first invention is intended to obtain regional information such as a map of an area as a destination to which a person is going on business trip or the like and transport facilities therein before starting off, using the information retrieval equipment such as a microcomputer by retrieving the database stored with the regional information.

Further, the regional information thus obtained or ID indicating an area where the regional information has been registered when the regional information is obtained from a regional information database site via the Internet is transmitted to the portable information terminal unit carried into the destination area by designating the electronic mail address of the portable information terminal unit.

The regional information or the ID indicative of the registered area above transmitted from the electronic mail is preserved in the mail server of the electronic mail site via the Internet together with the electronic mail address of the portable information terminal unit as the transmitting destination.

Then the person who has started out on business trip or the like into the destination area with the portable information terminal unit carried therewith locally gains access to the electronic mail site from the portable information terminal unit via a mobile communication network whereby to obtain the regional information preserved beforehand so as to display the regional information images on the display unit of the portable information terminal unit.

As set forth above, according to the first invention, any person traveling within the desired area is able to obtain regional information such as the map of the area and transport facilities therein, and display the regional information images, using PDA carried therewith and a portable telephone having an electronic mailing function. Consequently, the person is allowed to travel while checking the regional information such as the map of the area, whereby traveling in any unfamiliar area is extremely facilitated.

In order to accomplish the first object above, a regional information providing method according to a second invention in addition to the first invention is characterized by the inclusion of map information in the regional information.

As map images in the area where the portable information terminal unit is carried in are displayed on the display unit of the portable information terminal unit under the regional information providing method according to the second invention, the geography of an unfamiliar area can readily be grasped, whereby traveling in that area is extremely facilitated.

In order to accomplish the first object above, a regional information providing method according to a third invention in addition to the first invention is such that the database stored with the regional information is connected via the Internet to the information retrieval equipment.

Under the regional information providing method according to the third invention, a database server of the site connected via the Internet to the information retrieval equipment has the database stored with the regional information, so that the information retrieval is carried out via the Internet.

In order to accomplish the first object above, a regional information providing method according to a fourth invention in addition to the first invention is characterized in that the portable information terminal unit is a portable telephone having the electronic mailing function.

Under the regional information providing method according to the fourth invention, the diffusion of portable telephones in recent years makes it possible to readily obtain regional information within the traveling area, thus facilitating traveling in any unfamiliar area.

In order to accomplish the second object above, a regional information providing system according to a fifth invention comprises: a database stored with regional information; information retrieval equipment having a function of retrieving and obtaining regional information on a desired area from the database and an electronic mailing function; an electronic mail server for preserving regional information on the desired area transmitted from the information retrieval equipment by electronic mail together with the electronic mail address of a transmitting destination; and a portable information terminal unit which has the electronic mail address, receives the regional information preserved in the electronic mail server and displays regional information images on its display unit, the portable information terminal unit being carried into the desired area.

The regional information providing system according to the fifth invention is intended to retrieve and obtain regional information such as a map of an area as a destination to which a person is setting off on a trip and transport facilities therein, using the information retrieval equipment such as a microcomputer by retrieving the database stored with the regional information.

Further, the regional information thus obtained or ID indicating an area where the regional information has been registered when the regional information is obtained from a regional information database site via the Internet is transmitted to the portable information terminal unit carried into the destination area, using the electronic mailing function the information retrieval equipment is provided with by designating the electronic mail address of the portable information terminal unit.

The regional information or the ID indicative of the registered area above transmitted from the electronic mail is preserved in the mail server via the Internet together with the electronic mail address of the portable information terminal unit as the transmitting destination.

Then the person who has started out on business trip or the like into the destination area with the portable information terminal unit carried therewith locally gains access to the electronic mail site from the portable information terminal unit via a mobile communication network whereby to obtain the regional information preserved beforehand so as to display the regional information images on the display unit of the portable information terminal unit.

As set forth above, according to the fifth invention, any person traveling within the desired area is able to obtain regional information such as the map of the area and transport facilities therein, and display the regional information images, using PDA carried therewith and a portable telephone having the electronic mailing function. Consequently, the person is allowed to travel while checking the regional information such as the map of the area, whereby traveling in any unfamiliar area is extremely facilitated.

In order to accomplish the second object above, a regional information providing system according to a sixth invention in addition to the fifth invention is characterized in that the map information accumulated in the database is included in the regional information.

As map images in the area where the portable information terminal unit is carried in are displayed on the display unit of the portable information terminal unit under the regional information providing system according to the sixth invention, the geography of an unfamiliar area can readily be grasped, whereby traveling in that area is extremely facilitated.

In order to accomplish the second object above, a regional information providing system according to a seventh invention in addition to the fifth invention is characterized in that a regional information database site connected via the Internet to the information retrieval equipment is provided with the database stored with the regional information.

As the information retrieval equipment is connected via the Internet to the regional information database site under the regional information providing system according to the seventh invention, the information retrieval equipment is capable of obtaining regional information on the desired area by retrieving the database.

In order to accomplish the second object above, a regional information providing system according to a eighth invention in addition to the fifth invention is characterized in that the portable information terminal unit is a portable telephone having the electronic mailing function.

Under the regional information providing system according to the eighth invention, the diffusion of portable telephones in recent years makes it possible to readily obtain regional information within the desired area, thus facilitating traveling in any unfamiliar area.

BRIEF DESCRIPTION OF THE DRAWINGS

FIG. 2 is a flowchart showing an example of a regional information providing method embodying the invention.

DETAILED DESCRIPTION OF THE PREFERRED EMBODIMENTS

Figure 1:
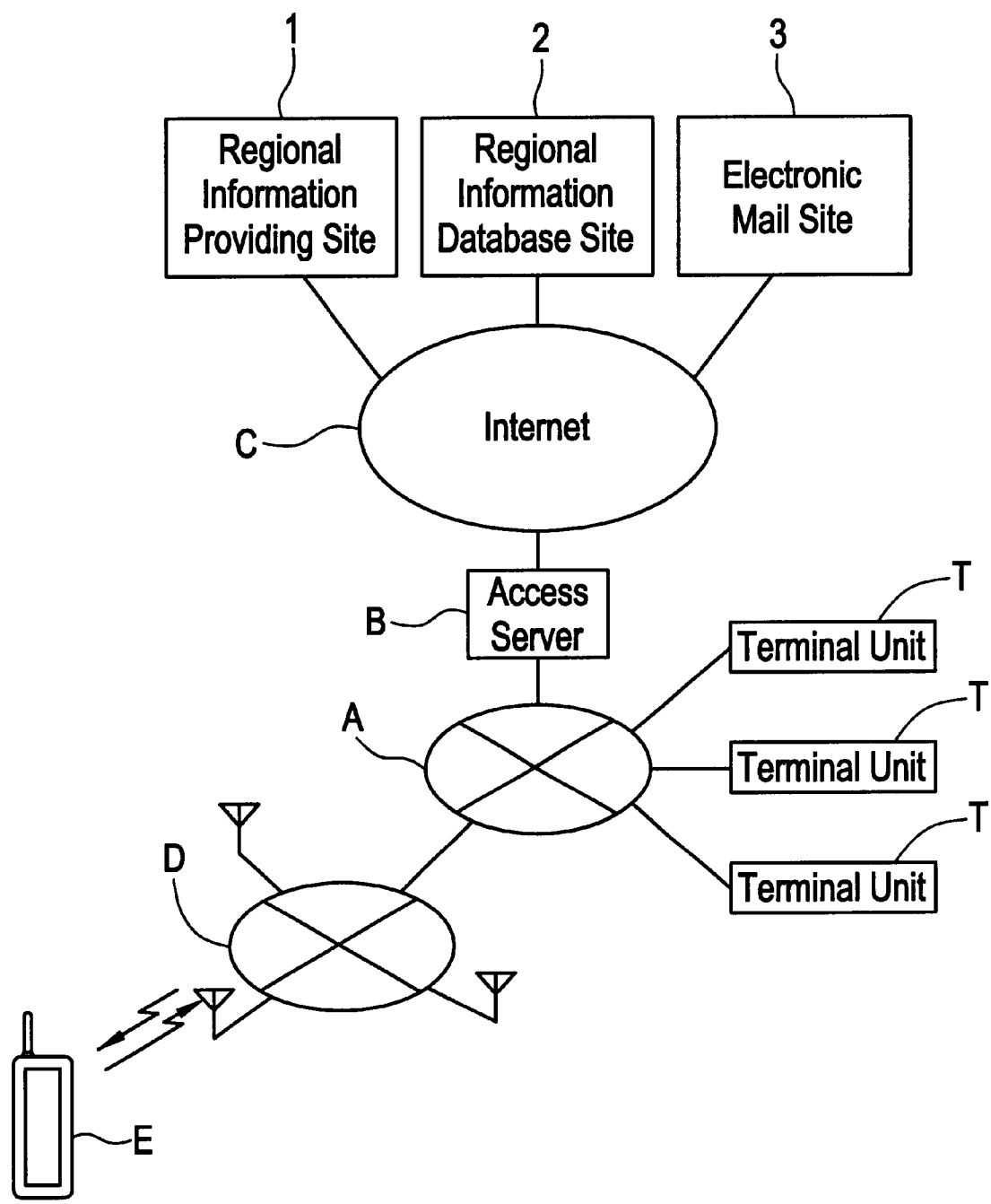
FIG. 1 is an exemplary regional information providing system configuration embodying the invention.

The most preferred embodiment of the invention will now be described in detail with reference to the drawings.

FIG. 1 is an exemplary regional information providing system configuration embodying the invention.

As shown in FIG. 1, terminal units T as information retrieval equipment are connected a public switched telephone network A, which telephone network A is connected to the Internet C via an access server B of a network service provider (NSP).

Further, a mobile communication network D is connected to the public switched telephone network A, so that portable information terminal units E such as PDAs (Personal Digital Assistants), portable telephones having an electronic mailing function (e.g., portable telephones corresponding to the i-mode) and so forth may be connected to the mobile communication network D.

On the other hand, a regional information providing site 1 as a WWW site, a regional information database site 2 and an electronic mail site 3 are connected to the Internet C.

The regional information providing site 1 is provided with landmarks including addresses and facilities, the landmark database stored with data corresponding to positional information, and a WWW server.

The regional information database site 2 is a site for use in offering services of retrieving and displaying regional information including map information on the Internet. The regional information database site 2 is provided with the regional information database stored with regional information such as the positional information of the area indicated by coordinates including latitude and longitude, and map image data corresponding to the positional information, and further a server for use in reading the regional map information data from the regional information database and transmitting the data to a terminal unit T in response to a request from the terminal unit T.

The electronic mail site 3 is provided with a mail server for preserving the electronic mail transmitted from a terminal unit T together with the electronic mail address of the transmitting destination and transmitting the electronic mail thus preserved to a portable information terminal unit E in response to a request for transmission from the portable information terminal unit E.

The terminal unit T is a user terminal capable of receiving WWW services by use of the application program called a WWW browser.

A method of providing regional information using the regional information providing system will now be described in accordance with a flowchart of FIG. 2.

First, a person who wishes to receive regional information through the regional information providing system uses the terminal unit T to acquire regional information such as a map of a desired area to which the person is going on business trip or the like and transport facilities therein via the Internet (Step s1).

In order to obtain such regional information, the terminal unit T is first connected to the Internet via the public switched telephone network A and the access server B so as to designate the URL (Uniform Resource Locator) of the regional information providing site 1 by means of the WWW browser set up in the terminal unit T.

Then an area whose regional information is desired is designated within the home page displayed on the terminal unit T by the HTML (Hyper Text Markup Language) text transmitted from the regional information providing site 1.

The terminal unit T obtains regional information including the map of the designated area and transport facilities stored in the regional information database from the regional information database site 2 on the basis of positional information corresponding to the designated area sent from the regional information providing site 1.

In the terminal unit T, the regional information thus obtained from the regional information database site 2 is e-mailed to a portable information terminal unit E to be carried into the designated area by designating its address (Step s2).

The transmission of the electronic mail is carried out by clicking the electronic-mail processing button displayed within the home page of the regional information providing site 1 displayed on the terminal unit T.

More specifically, the transmission of the electronic mail is carried out first by inputting the electronic mail address of the transmitting destination on the electronic-mail processing screen activated by clicking the electronic-mail processing button within the home page; that is, the electronic mail address (a telephone number when the portable information terminal unit E has an electronic mailing function) set in the portable information terminal unit E carried into the visiting area. Then the regional information file obtained in Step s1 or an ID (Identification Number) indicating an area where the regional information has been registered is sent to the electronic mail site 3.

In a case where the electronic-mail processing butting is not set within the home page of the regional information providing site 1 displayed on the terminal unit T, the transmission of such an electronic mail is carried out by executing the electronic mail application software stored in the terminal unit T.

Through the operations above, the regional information transmitted from the terminal unit T or ID indicative of the area where the regional information has been registered is transmitted to the mail server of the electronic mail site 3 via the public switched telephone network A, the access server B and the Internet C and stored therein together with the electronic mail address of the portable information terminal unit E.

The person who has traveled on business, for example, to the desired area with the portable information terminal unit E is allowed to locally acquire the regional information preserved in Step s2 by gaining access to the electronic mail site 3 via the mobile communication network D from the portable information terminal unit E (Step s3).

In other words, the portable information terminal unit E is connected to the electronic mail site 3 via the public switched telephone network A, the access server B and the Internet C from the mobile communication network D when the electronic mail function is actuated. Further, the portable information terminal unit E down-loads the regional information preserved at the electronic mail address by designating the address.

When the ID of the regional information together with the electronic mail address is preserved in the electronic mail site 3, the portable information terminal unit E receives the ID from the electronic mail site 3 and down-loads the corresponding regional information from the regional information database site 2 according to the ID.

The portable information terminal unit E displays images such as the map based on the down-loaded regional information on its display (Step s4).

As set forth above, any person who is traveling within the desired area is able to travel while checking the regional information such as the map of the area on the spot because the regional information of the area is displayed on the display of the portable information terminal unit E carried with the person.

Since the display of the portable information terminal unit E is generally smaller than the display unit of a microcomputer, the down-loaded regional information is sequentially displayed by scrolling the screen as the person travels, using the scroll key provided to the portable information terminal unit E when the whole regional information cannot be displayed thereon at a time.

Although the regional information has been so arranged as to be obtained by the terminal unit T via the Internet according to this embodiment of the invention, it may be obtained thereby from retrieval application software having an electronic dictionary of map information.

What is claimed is:

1. A regional information providing method comprising the steps of:

accessing a regional information providing web site, using information retrieval equipment;

designating a desired area within a pare of the web site displayed on the information retrieval equipment, using the information retrieval equipment;

obtaining regional information on the desired area from a database storing the regional information, using the information retrieval equipment;

generating an electronic mail through interaction between the information retrieval equipment and the web site, said electronic mail including the obtained regional information on the desired area and an electronic mail address of a portable information terminal unit to be carried into the desired area;

transmitting the electronic mail to an electronic mail server to preserve the regional information and the electronic mail address therein; and causing said portable information terminal unit carried into the desired area to receive the regional information preserved in the electronic mail server and to display regional information images on a display unit of said portable information terminal unit.

2. The regional information providing method as claimed in claim 1, wherein the regional information includes map information.

3. The regional information providing method as claimed in claim 2, wherein said map information includes at least one map image.

4. The regional information providing method as claimed in claim 1, wherein the database storing the regional information is connected via the Internet to said information retrieval equipment.

5. The regional information providing method as claimed in claim 1, wherein said portable information terminal unit is a portable telephone having an electronic mailing function.

6. The regional information providing method as claimed in claim 1, wherein said information retrieval equipment includes a computer running a web browser application.

7. The regional information providing method as claimed in claim 1, wherein the regional information stored in said database includes information on transportation facilities.

8. The regional information providing method as claimed in claim 1, wherein the step of obtaining regional information acquires an identifier indicating an area where the regional information has been registered.

9. The regional information providing method as claimed in claim 8, wherein said identifier is a URL.

10. The regional information providing method as claimed in claim 8, wherein the portable information terminal unit uses said identifier to acquire the regional information from the area where the regional information has been registered.

11. A regional information providing system comprising:
a database which stores regional information;
information retrieval equipment having a function of accessing a regional information providing web site, designating a desired area with a page of the web site displayed on the information retrieval equipment, retrieving regional information on the desired area from the database and interacting with the web site to generate an electronic mail including the retrieved regional information on the desired area and an electronic mail address of a portable information terminal unit to be carried into the desired area; and an electronic mail server for receiving the electronic mail to preserve the regional information on the desired area together with the electronic mail address of the portable information terminal unit, wherein the portable information terminal unit having the electronic mail address and being carried into the desired area receives the regional information preserved in the electronic mail server and displays regional information images on a display unit thereof.

12. The regional information providing system as claimed in claim 11, wherein the regional information stored in the database includes map information.

13. The regional information providing system as claimed in claim 12, wherein said map information includes at least one map image.

14. The regional information providing system as claimed in claim 11, wherein a regional information database site connected via the Internet to the information retrieval equipment is provided with the database storing the regional information.

15. The regional information providing system as claimed in claim 11, wherein said portable information terminal unit is a portable telephone having an electronic mailing function.

16. The regional information providing system as claimed in claim 11, wherein said information retrieval equipment includes a computer running a web browser application.

17. The regional information providing system as claimed in claim 11, wherein the regional information stored in said database includes information on transportation facilities.

18. The regional information providing system as claimed in claim 11, wherein said information retrieval equipment includes a function for acquiring an identifier indicating where said regional information has been registered.

19. The regional information providing system as claimed in claim 18, wherein said identifier is a URL.

20. The regional information providing system as claimed in claim 18, wherein the portable information terminal unit uses said identifier to acquire the regional information from its registered location.

* * * * *